US009750100B2

(12) United States Patent
Ivey et al.

(10) Patent No.: US 9,750,100 B2
(45) Date of Patent: Aug. 29, 2017

(54) LIGHT EMITTING DIODE LAMP DIMMING SIGNAL

(71) Applicant: ILUMISYS, INC., Troy, MI (US)

(72) Inventors: John Ivey, Farminton Hills, MI (US); Francis Palazzolo, Shelby Township, MI (US)

(73) Assignee: iLumisys, Inc., Troy, MI (US)

( * ) Notice: Subject to any disclaimer, the term of this patent is extended or adjusted under 35 U.S.C. 154(b) by 0 days.

(21) Appl. No.: 15/148,027

(22) Filed: May 6, 2016

(65) Prior Publication Data

US 2016/0330816 A1   Nov. 10, 2016

Related U.S. Application Data

(60) Provisional application No. 62/158,872, filed on May 8, 2015.

(51) Int. Cl.
*H05B 37/02* (2006.01)
*H05B 33/08* (2006.01)
(Continued)

(52) U.S. Cl.
CPC ......... *H05B 33/0845* (2013.01); *F21K 9/175* (2013.01); *F21V 5/04* (2013.01); *F21V 15/015* (2013.01); *F21V 23/023* (2013.01); *F21V 29/70* (2015.01); *H05B 33/0815* (2013.01); *H05B 33/0884* (2013.01); *H05B 37/0272* (2013.01);
(Continued)

(58) Field of Classification Search
CPC ............ H05B 33/0845; H05B 33/0815; H05B 33/0884; H05B 37/0272; H05B 33/0806; H05B 37/02; H05B 33/0842; F21K 9/175; F21K 9/27; F21V 5/04; F21V 23/023; F21V 29/70; F21V 15/015; F21V 23/009; F21V 19/008; F21V 23/00; F21Y 2103/003;
(Continued)

(56) References Cited

U.S. PATENT DOCUMENTS

| 7,510,299 B2 * | 3/2009 | Timmermans ..... H05B 33/0803 362/221 |
| 8,749,167 B2 * | 6/2014 | Hsia ........................ F21V 25/00 315/209 R |

(Continued)

FOREIGN PATENT DOCUMENTS

WO       2015/066566       5/2015

OTHER PUBLICATIONS

International Search Report for PCT/US2016/031245 dated Jul. 27, 2016.

*Primary Examiner* — Vibol Tan
(74) *Attorney, Agent, or Firm* — Fish & Richardson P.C.

(57) ABSTRACT

A light emitting diode based light configured for replacing a fluorescent light in a light fixture has a housing, at least one light emitting diode (LED), a power connector at a first end of the housing configured for connection to the light fixture and configured for receiving a power signal from a power source, a dimming control connector at a second end of the housing configured for receiving a dimming control signal and a power trace. The power trace is configured to carry the power signal from the power connector to the LED, and carry the dimming control signal from the dimming control connector to the power connector, such that the power signal is controlled in response to the dimming control signal.

32 Claims, 6 Drawing Sheets

(51) Int. Cl.
*F21V 15/015* (2006.01)
*F21V 5/04* (2006.01)
*F21V 23/02* (2006.01)
*F21V 29/70* (2015.01)
*F21K 99/00* (2016.01)
*F21Y 103/00* (2016.01)

(52) U.S. Cl.
CPC ....... *F21Y 2103/003* (2013.01); *Y02B 20/386* (2013.01)

(58) Field of Classification Search
CPC . F21Y 2115/10; Y02B 20/341; Y02B 20/386; Y02B 20/346
See application file for complete search history.

(56) References Cited

U.S. PATENT DOCUMENTS

| | | | |
|---|---|---|---|
| 2010/0033095 A1 | 2/2010 | Sadwick | |
| 2012/0299494 A1* | 11/2012 | Hartikka | H05B 33/0842 315/201 |
| 2014/0265900 A1* | 9/2014 | Sadwick | H05B 33/0803 315/200 R |
| 2014/0265922 A1 | 9/2014 | Gilliom et al. | |
| 2014/0340884 A1* | 11/2014 | Hsia | F21V 23/009 362/221 |
| 2015/0098228 A1* | 4/2015 | Simon | F21K 9/17 362/311.02 |
| 2015/0204487 A1* | 7/2015 | Scapa | F21V 23/006 362/222 |

\* cited by examiner

LIGHT EMITTING DIODE LAMP DIMMING SIGNAL

CROSS-REFERENCE TO RELATED APPLICATION

This application claims priority to U.S. Provisional Application Ser. No. 62/158,872, filed on May 8, 2015, incorporated herein in its entirety by reference.

TECHNICAL FIELD

The embodiments disclosed herein relate to a light emitting diode (LED)-based light for replacing a conventional light in a standard light fixture.

BACKGROUND

Fluorescent lights are widely used in a variety of locations, such as schools and office buildings. Although conventional fluorescent lights have certain advantages over, for example, incandescent lights, they also pose certain disadvantages including, inter alia, disposal problems due to the presence of toxic materials within the light. Accordingly, LED-based lights, designed as one-for-one replacements for fluorescent lights, may be advantageous.

BRIEF SUMMARY

Disclosed herein are embodiments of a light emitting diode based light configured for replacing a fluorescent light in a light fixture. One such embodiment comprises a housing, at least one light emitting diode (LED), a power connector at a first end of the housing configured for connection to the light fixture and configured for receiving a power signal from a power source, a dimming control connector at a second end of the housing configured for receiving a dimming control signal and a power trace. The power trace is configured to carry the power signal from the power connector to the LED, and carry the dimming control signal from the dimming control connector to the power connector, such that the power signal is controlled in response to the dimming control signal.

These and other aspects of the present disclosure are disclosed in the following detailed description of the embodiments, the appended claims and the accompanying figures.

BRIEF DESCRIPTION OF THE DRAWINGS

The various features, advantages and other uses of the present apparatus will become more apparent by referring to the following detailed description and drawings.

DETAILED DESCRIPTION

A light emitting diode (LED) based lamp for replacing a conventional light in a standard light fixture may be dimmable. For example, an LED lamp may include dimming input pins that may receive a dimming input signal. In some embodiments, a circuit connected to the dimming input pins may be electrically isolated from power line circuits inside the lamp. For example, the dimming system may use low-voltage signaling, such as class 2 signaling, which may be safe for human touch and safe from fire hazard, and internal voltages in a lamp may not use low-voltage signaling that is safe for human touch and safe from fire hazard.

In some LED lamp configurations, the transmission of dimming signals within the lamp may be inefficient. For example, the dimming signal may be received at a one end, and power may be received at the other end of the lamp, and dedicated signal wires, which may be long and difficult to handle, such as by automated equipment, may be run from the dimming end to the power supply of the lamp. In another example, signal traces may be run through a printed circuit board on which the LEDs are mounted; however, the signal trace runs may lack clearance and connector pins between the LED board and a power supply board may be unavailable.

As disclosed herein, in some implementations, the dimming signal may be transmitted using the traces that power the LEDs. For example, a dimming signal, which may be an analog dimming signal, or any other dimming signal, may be converted to a pulse-width modulation (PWM) signal, or other similar signal, a relatively high frequency signal, such as a 40 kHz signal, or a similar signal, may be modulated with the PWM signal, and the modulated signal may be superimposed on the DC current passing through the LEDs.

Figure 1:
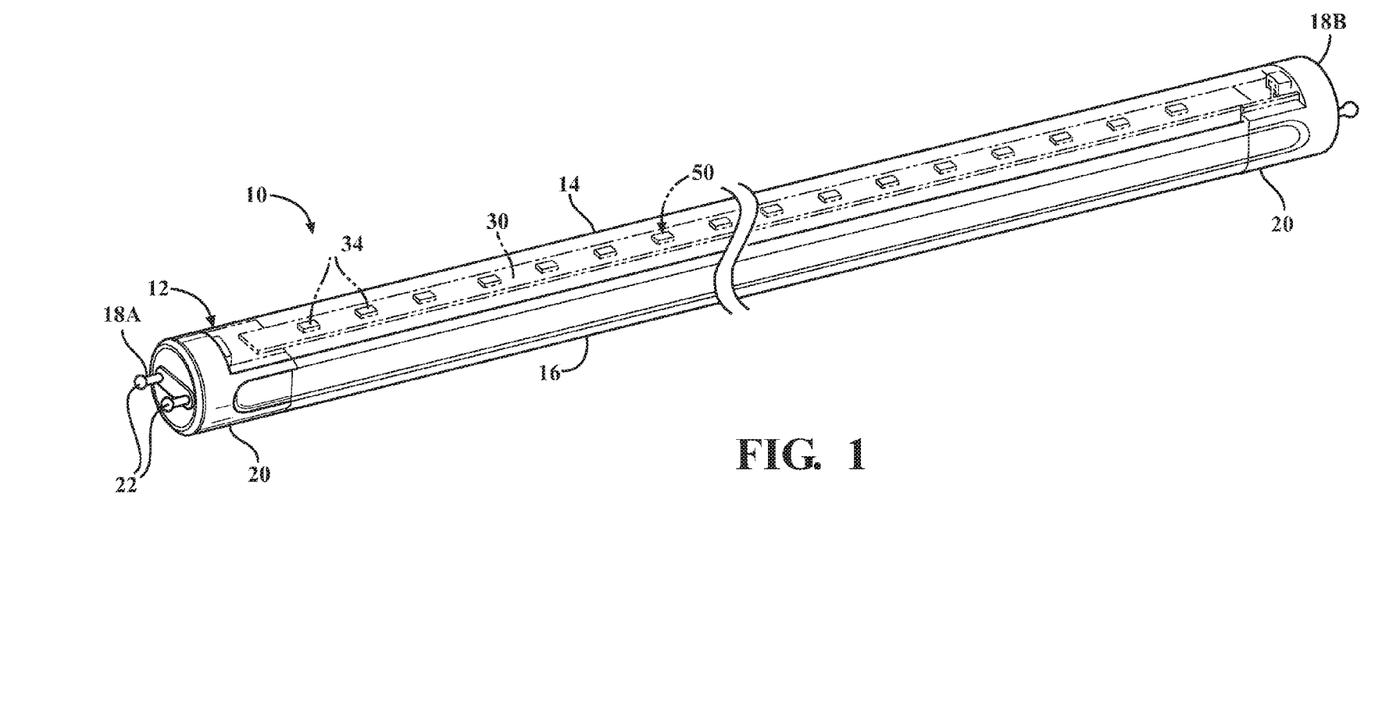
FIG. 1 is a perspective view of an example of an LED-based light.
Figure 2:
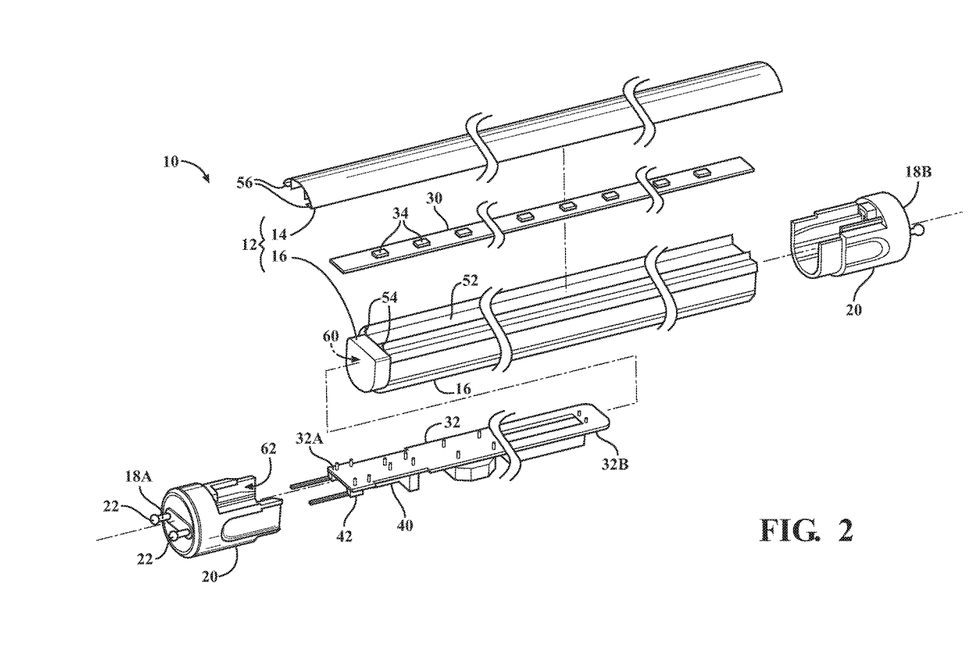
FIG. 2 is a perspective assembly view of the LED-based light of FIG. 1 showing a housing including a lower portion and a lens, an LED circuit board, a power supply circuit board and a pair of end caps.
Figure 3:
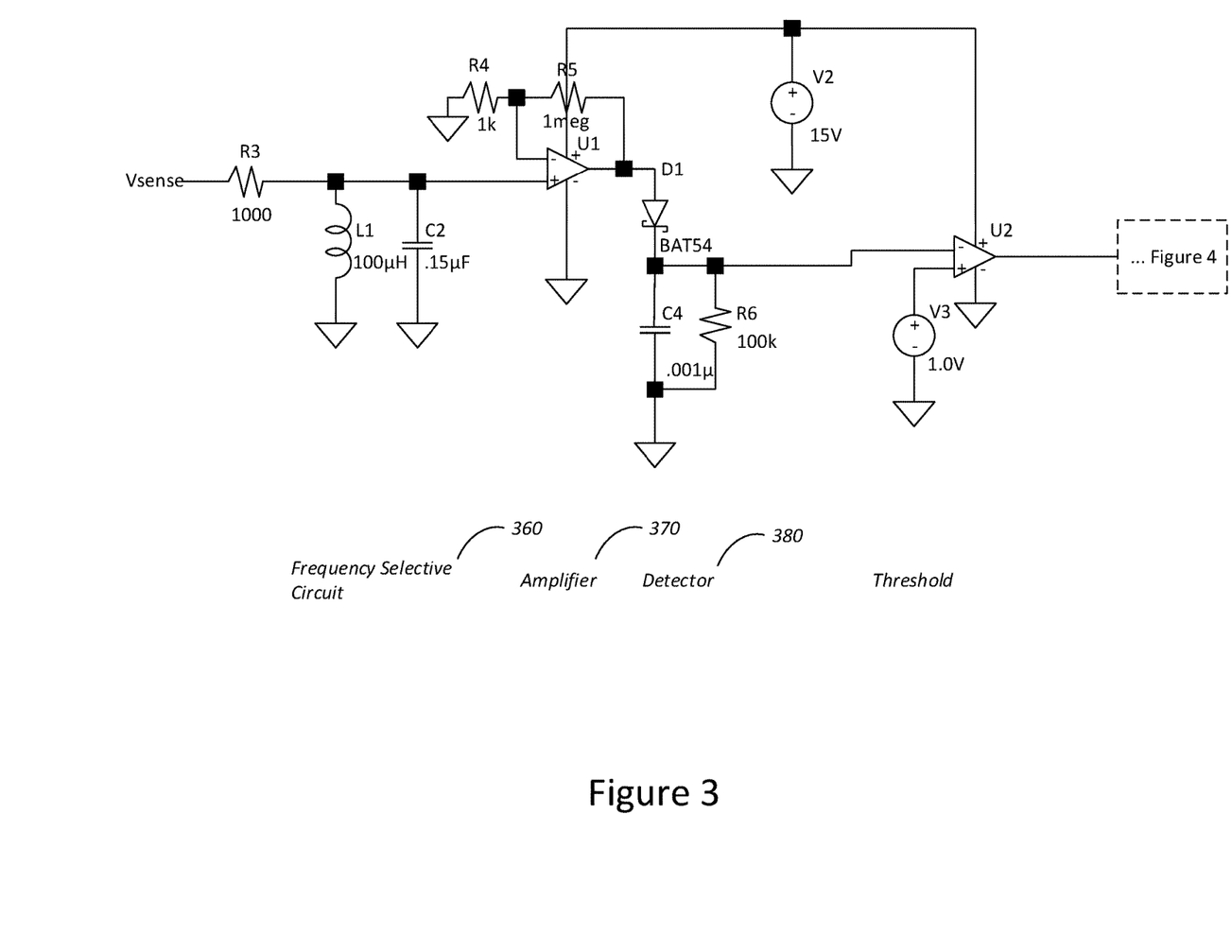
FIGS. 3-6 show a circuit diagram of an example of an LED circuit using power traces for dimming level signaling in accordance with embodiments of this disclosure.
Figure 4:
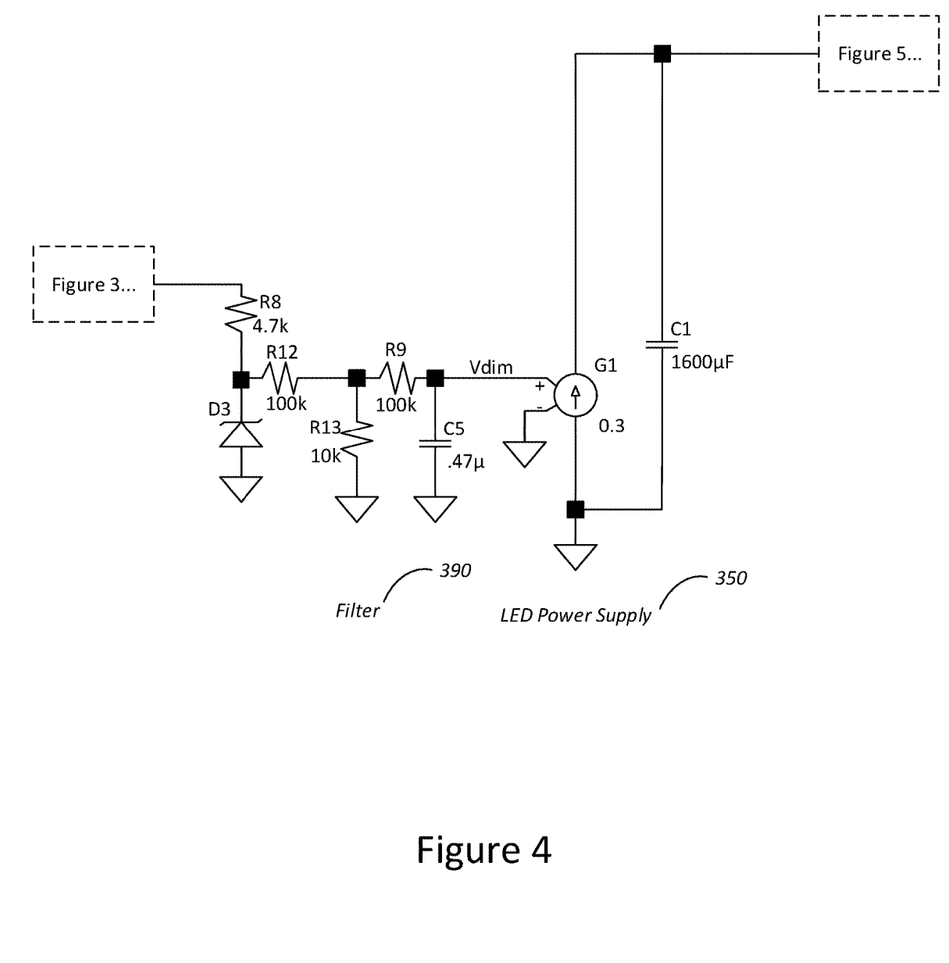

FIGS. 1 and 2 illustrate an LED-based light 10 for replacing a conventional light in a standard light fixture. The LED-based light 10 includes a housing 12 and has a pair of end caps 20 positioned at the ends of the housing 12. An LED circuit board 30 including LEDs 34 and a power supply circuit board 32 are arranged within the housing 12.

The housing 12 can generally define a single package sized for use in a standard fluorescent light fixture. In the illustrated example, the pair of end caps 20 is attached at opposing longitudinal ends of the housing 12 for physically connecting the LED-based light 10 to a light fixture. As shown, each end cap 20 carries an electrical connector 18 configured to physically connect to the light fixture. The electrical connectors 18 can be the sole physical connection between the LED-based light 10 and the light fixture. One example of a light fixture for the LED-based light 10 is a troffer designed to accept conventional fluorescent lights, such as T5, T8 or T12 fluorescent tube lights. These and other light fixtures for the LED-based light 10 can include one or more sockets adapted for physical engagement with the electrical connectors 18. Each of the illustrated electrical connectors 18 is a bi-pin connector including two pins 22. Bi-pin electrical connectors 18 are compatible with many fluorescent light fixtures and sockets, although other types of electrical connectors can be used, such as a single pin connector or a screw type connector.

The light fixture can connect to a power source, and at least one of the electrical connectors 18 can additionally electrically connect the LED-based light 10 to the light fixture to provide power to the LED-based light 10. In this example, each electrical connector 18 can include two pins 22, although two of the total four pins can be "dummy pins" that provide physical but not electrical connection to the light fixture. The light fixture can optionally include a ballast for electrically connecting between the power source and the LED-based light 10.

While the illustrated housing 12 is cylindrical, a housing having a square, triangular, polygonal, or other cross sectional shape can alternatively be used. Similarly, while the illustrated housing 12 is linear, housings having an alternative shape, e.g., a U-shape or a circular shape can alternatively be used. The LED-based light 10 can have any suitable length. For example, the LED-based light 10 may be approximately 48" long, and the housing 12 can have a 0.625", 1.0" or 1.5" diameter for engagement with a standard fluorescent light fixture.

The housing 12 can be formed by attaching multiple individual parts, not all of which need be light transmitting. For example, illustrated example of the housing 12 is formed in part by attaching a lens 14 at least partially defining the housing 12 to an opaque lower portion 16. The illustrated housing 12 has a generally bipartite configuration defining a first cavity 50 between the lower portion 16 and the lens 14 sized and shaped for housing the LED circuit board 30 and a second cavity 60 defined by the lower portion 16 sized and shaped for housing the power supply circuit board 32.

As shown, the lower portion 16 defines an LED mounting surface 52 for supporting the LED circuit board 30. The LED mounting surface 52 can be substantially flat, so as to support a flat underside of the LED circuit board 30 opposite the LEDs 34. After attachment of the lens 14 to the lower portion 16 during assembly of the LED-based light 10, the LED circuit board 30 is positioned within the first cavity 50 and adjacent the lens 14, such that the LEDs 34 of the LED circuit board 30 are oriented to illuminate the lens 14.

The illustrated lower portion 16 has a tubular construction to define the second cavity 60, although the lower portion 16 could be otherwise configured to define a cavity configured for housing the power supply circuit board 32. The LED-based light 10 can include features for supporting the power supply circuit board 32 within the second cavity 60. For example, as shown, an end cap 20 may include channels 62 configured to slidably receive outboard portions of an end 32a of the power supply circuit board 32. It will be understood that the channels 62 are provided as a non-limiting example and that the power supply circuit board 32 may be otherwise and/or additionally supported within the second cavity 60.

The lower portion 16 may be constructed from a thermally conductive material and configured as a heat sink to enhance dissipation of heat generated by the LEDs 34 during operation to an ambient environment surrounding the LED-based light 10. In the exemplary LED-based light 10, an LED mounting surface 52 of the lower portion 16 is thermally coupled to the LEDs 34 through the LED circuit board 30, and the remainder of the lower portion 16 defines a heat transfer path from the LED mounting surface 52 to the ambient environment.

The lower portion 16 and the lens 14 may each include complementary structures permitting for attachment of the lens 14 to the lower portion 16 to define the first cavity 50. For example, as shown, the lower portion 16 may include a pair of hooked projections 54 for retaining a corresponding pair of projections 56 of the lens 14. The projections 56 of the lens 14 can be slidably engaged with the hooked projections 54 of the lower portion 16, or can be snap fit to the hooked projections 54. The hooked projections 54 can be formed integrally with the lower portion 16 by, for example, extruding the lower portion 16 to include the hooked projections 54. Similarly, the projections 56 can be formed integrally with the lens 14 by, for example, extruding the lens 14 to include the projections 56. The hooked projections 54 and projections 56 can extend the longitudinal lengths of the lower portion 16 and the lens 14, respectively, although a number of discrete hooked projections 54 and/or projections 56 could be used to couple the lens 14 to the lower portion 16. Alternatively, the lower portion 16 could be otherwise configured for attachment with the lens 14. For example, the lens 14 could be clipped, adhered, snap- or friction-fit, screwed or otherwise attached to the lower portion 16.

Alternatively to the illustrated housing 12, the housing 12 can include a light transmitting tube at least partially defined by the lens 14. The lens 14 can be made from polycarbonate, acrylic, glass or other light transmitting material (i.e., the lens 14 can be transparent or translucent). The term "lens" as used herein means a light transmitting structure, and not necessarily a structure for concentrating or diverging light.

The LED-based light 10 can include features for distributing the light produced by the LEDs 34 to, for example, emulate in full or in part the uniform light distribution of a conventional fluorescent light. For instance, the lens 14 can be manufactured to include light diffusing structures, such as ridges, dots, bumps, dimples or other uneven surfaces formed on an interior or exterior of the lens 14. The light diffusing structures can be formed integrally with the lens 14, for example, by molding or extruding, or the structures can be formed in a separate manufacturing step such as surface roughening. Alternatively, the material from which the lens 14 is formed can include light refracting particles. For example, the lens 14 can be made from a composite, such as polycarbonate, with particles of a light refracting material interspersed in the polycarbonate. In addition to or as an alternative to these light diffusing structures, a light diffusing film can be applied to the exterior of the lens 14 or placed in the housing 12.

The LED-based light 10 can include other features for distributing light produced by the LEDs 34. For example, the lens 14 can be manufactured with structures to collimate light produced by the LEDs 34. The light collimating structures can be formed integrally with the lens 14, for example, or can be formed in a separate manufacturing step. In addition to or as an alternative to manufacturing the lens 14 to include light collimating structures, a light collimating film can be applied to the exterior of the lens 14 or placed in the housing 12.

In yet other embodiments, the LEDs 34 can be over molded or otherwise encapsulated with light transmitting material configured to distribute light produced by the LEDs 34. For example, the light transmitting material can be configured to diffuse, refract, collimate and/or otherwise distribute the light produced by the LEDs 34. The over molded LEDs 34 can be used alone to achieve a desired light distribution for the LED-based light 10, or can be implemented in combination with the lens 14 and/or films described above.

The above described or other light distributing features can be implemented uniformly or non-uniformly along a length and/or circumference of the LED-based light 10. These features are provided as non-limiting examples, and in other embodiments, the LED-based light 10 may not include any light distributing features.

The LED circuit board 30 can include at least one LED 34, a plurality of series-connected or parallel-connected LEDs 34, an array of LEDs 34 or any other arrangement of LEDs 34. Each of the illustrated LEDs 34 can include a single diode or multiple diodes, such as a package of diodes producing light that appears to an ordinary observer as coming from a single source. The LEDs 34 can be surface-mount devices of a type available from Nichia, although other types of LEDs can alternatively be used. For example, the LED-based light 10 can include high-brightness semiconductor LEDs, organic light emitting diodes (OLEDs), semiconductor dies that produce light in response to current, light emitting polymers, electro-luminescent strips (EL) or the like. The LEDs 34 can emit white light. However, LEDs that emit blue light, ultra-violet light or other wavelengths of light can be used in place of or in combination with white light emitting LEDs 34.

The orientation, number and spacing of the LEDs 34 can be a function of a length of the LED-based light 10, a desired lumen output of the LED-based light 10, the wattage of the LEDs 34, a desired light distribution for the LED-based light 10 and/or the viewing angle of the LEDs 34.

The LEDs 34 can be fixedly or variably oriented in the LED-based light 10 for facing or partially facing an environment to be illuminated when the LED-based light 10 is installed in a light fixture. Alternatively, the LEDs 34 can be oriented to partially or fully face away from the environment to be illuminated. In this alternative example, the LED-based light 10 and/or a light fixture for the LED-based light 10 may include features for reflecting or otherwise redirecting the light produced by the LEDs into the environment to be illuminated.

For a 48" LED-based light 10, the number of LEDs 34 may vary from about thirty to sixty such that the LED-based light 10 outputs approximately 3,000 lumens. However, a different number of LEDs 34 can alternatively be used, and the LED-based light 10 can output any other amount of lumens.

The LEDs 34 can be arranged in a single longitudinally extending row along a central portion of the LED circuit board 30, as shown in FIG. 2, or can be arranged in a plurality of rows or arranged in groups. The LEDs 34 can be spaced along the LED circuit board 30 and arranged on the LED circuit board 30 to substantially fill a space along a length of the lens 14 between end caps 20 positioned at opposing longitudinal ends of the housing 12. The spacing of the LEDs 34 can be determined based on, for example, the light distribution of each LED 34 and the number of LEDs 34. The spacing of the LEDs 34 can be chosen so that light output by the LEDs 34 is uniform or non-uniform along a length of the lens 14. In one implementation, one or more additional LEDs 34 can be located at one or both ends of the LED-based light 10 so that an intensity of light output at the lens 14 is relatively greater at the one or more ends of the LED-based light 10. Alternatively, or in addition to spacing the LEDs 34 as described above, the LEDs 34 nearer one or both ends of the LED-based light 10 can be configured to output relatively more light than the other LEDs 34. For instance, LEDs 34 nearer one or both ends of the LED-based light 10 can have a higher light output capacity and/or can be provided with more power during operation.

The power supply circuit board 32 is positioned within the housing 12 adjacent the electrical connector 18 and has power supply circuitry configured to condition an input power received from, for example, the light fixture through the electrical connector 18, to a power usable by and suitable for the LEDs 34. In some implementations, the power supply circuit board 32 can include one or more of an inrush protection circuit, a surge suppressor circuit, a noise filter circuit, a rectifier circuit, a main filter circuit, a current regulator circuit and a shunt voltage regulator circuit. The power supply circuit board 32 can be suitably designed to receive a wide range of currents and/or voltages from a power source and convert them to a power usable by the LEDs 34.

The LED-based light 10 may require a number of electrical connections to convey power between the various illustrated spatially distributed electrical assemblies included in the LED-based light 10, such as the LED circuit board 30, the power supply circuit board 32 and the electrical connector 18. These connections can be made using a circuit connector header 40 and a pin connector header 42, as shown in FIG. 2. In particular, when the LED-based light 10 is assembled, the circuit connector header 40 may be arranged to electrically couple the LED circuit board 30 to the power supply circuit board 32, and the pin connector header 42 may be arranged to electrically couple the power supply circuit board 32 to the pins 22 of an end cap 20.

As shown, the LED circuit board 30 and the power supply circuit board 32 are vertically opposed and spaced with respect to one another within the housing 12. The LED circuit board 30 and the power supply circuit board 32 can extend a length or a partial length of the housing 12, and the LED circuit board 30 can have a length different from a length of the power supply circuit board 32. For example, the LED circuit board 30 can generally extend a substantial length of the housing 12, and the power supply circuit board 32 can extend a partial length of the housing. However, it will be understood that the LED circuit board 30 and/or the power supply circuit board 32 could be alternatively arranged within the housing 12, and that the LED circuit board 30 and the power supply circuit board 32 could be alternatively spaced and/or sized with respect to one another.

The LED circuit board 30 and the power supply circuit board 32 are illustrated as elongate printed circuit boards. Multiple circuit board sections can be joined by bridge connectors to create the LED circuit board 30 and/or power supply circuit board 32. Also, other types of circuit boards may be used, such as a metal core circuit board. Further, the components of the LED circuit board 30 and the power supply circuit board 32 could be in a single circuit board or more than two circuit boards.

FIGS. 3-6 are a circuit diagram of an example of an LED circuit using power traces for dimming level signaling in accordance with embodiments of this disclosure. In some embodiments, the circuit may be implemented in a lamp, such as the lamp 10 shown in FIGS. 1 and 2. For example, the LED power trace dimming signal circuit may be implemented in the power supply circuit board 32 shown in FIGS. 1 and 2. In some implementations, a first end of the lamp, such as the first end 18A shown in FIGS. 1 and 2, may be connected to a power source, and may be referred to herein as the power end. The power end may include an LED power supply. A second end, such as the second end 18B shown in FIGS. 1 and 2, may connect to a control, such as a 0-10V dimming control, and may be referred to herein as the dimming end.

Figure 6:
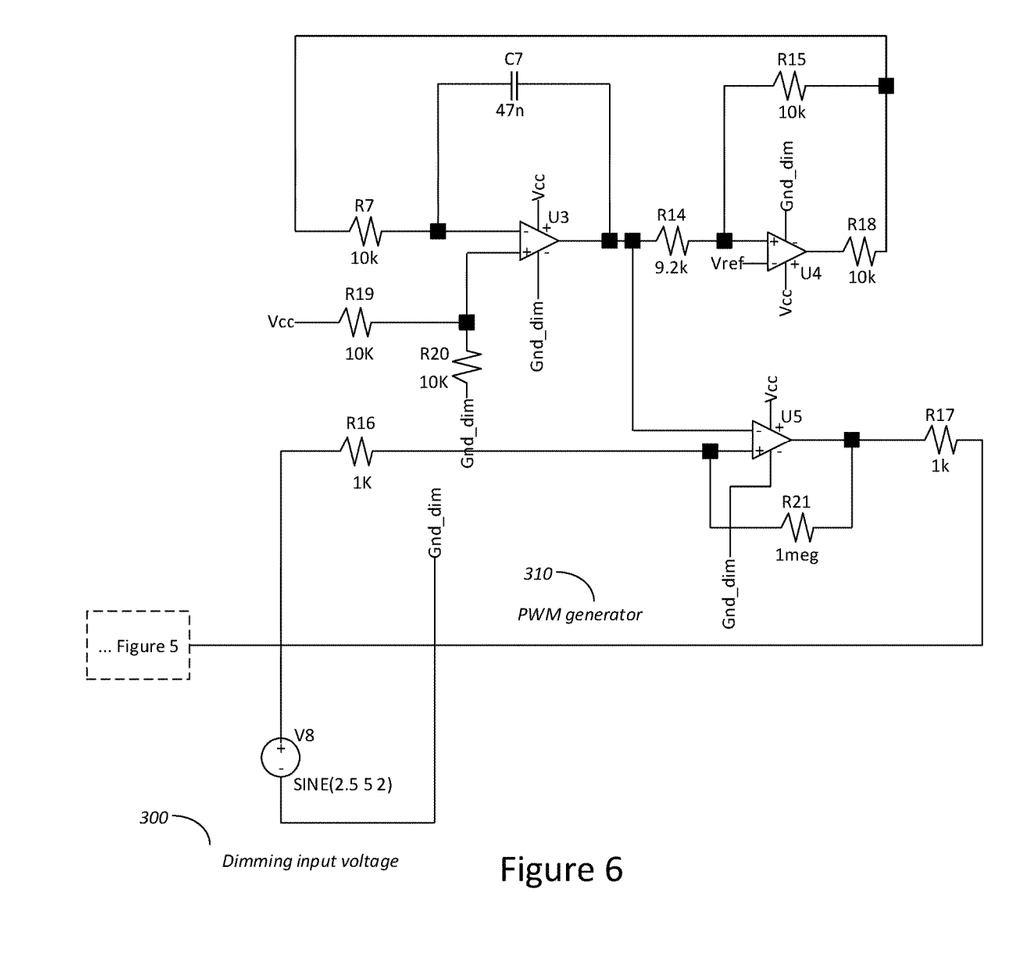

In some embodiments, an analog dimming signal V8 enters the lamp at the pins of the dimming end of the lamp (shown at 300 in FIG. 6). The analog dimming signal V8 may enter a PWM generator (shown at 310 in FIG. 6). The PWM generator 310 may generate a PWM signal, which may have a duty cycle that is related to the analog dimming signal 300. For example, the duty cycle of the PWM signal may be proportional to the analog dimming signal.

Figure 5:
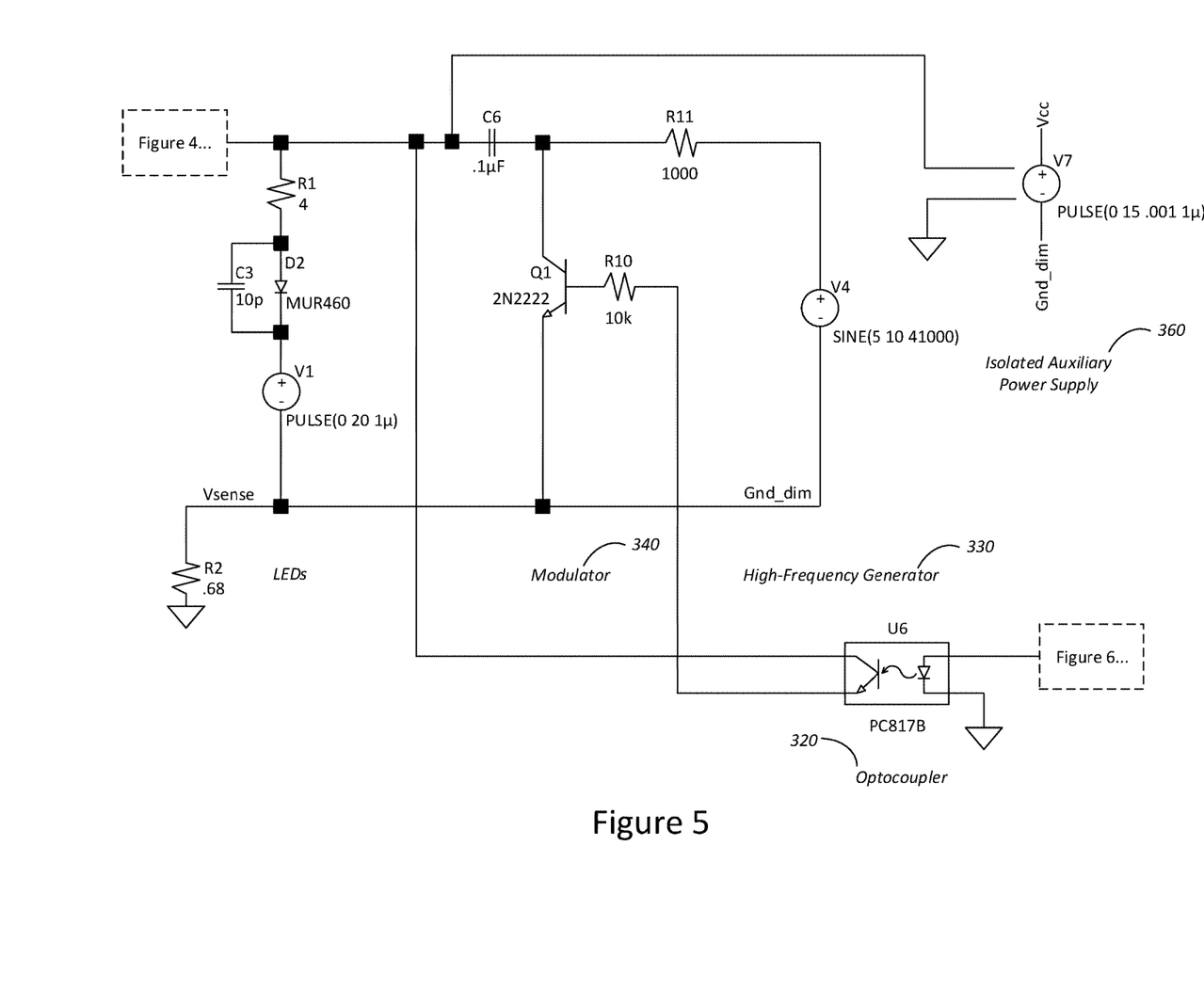

In some embodiments, the PWM signal may be passed through an optocoupler (shown at 320 in FIG. 5). The optocoupler 320 may electrically isolate the dimming pins from the LED power. A relatively high-frequency signal may be generated (shown at 330 in FIG. 5) and modulated (shown at 340 in FIG. 5) by a transistor. The transistor may be enabled and disabled synchronously in time with the PWM signal. Although one modulation scheme is shown in FIGS. 3-6, any modulation scheme, or combination of modulation schemes, may be used.

In some embodiments, the dimming circuit may receive power from the dimming signal. Alternatively, or in addition, the dimming circuit may receive power from the LED power supply (shown at 350 in FIG. 4). For example, the dimming circuit may receive power from the LED power supply and the LED power trace dimming signal circuit may include an isolated power supply between the LED power supply and the dimming circuit (shown at 360 in FIG. 5). In some embodiments, a lamp may include, or may be operatively coupled with, an external dimmer and one or more power supply units of the lamp may, or operatively coupled with the lamp, may include a dimming control unit, such as a power supply dimming circuit.

The modulated high-frequency signal may be coupled to the LED power supply traces, which may receive the modulation signal as a high-frequency change in the current drawn by the LEDs. In some embodiments, the modulated current may be small with respect to the LED current. In some embodiments, the modulated current may have a zero DC component, and the action of the dimming signal may not directly change the average LED light output. Thus, the current passing through the LED power supply traces may include the modulated high-frequency signal.

The modulated high-frequency signal may pass through the LED power supply traces to the power supply, and may pass through a current sensing resistor. The voltage across the current sensing resistor may be sent to a frequency-selective circuit (shown at 360 in FIG. 3), such as a resistor-capacitor (RC) circuit, which may respond preferentially to the high-frequency signal. The high-frequency signal may be amplified (shown at 370 in FIG. 3) and sent to a detector (shown at 380 in FIG. 3), such as a diode envelope detector. The detector may generate a PWM signal with a duty cycle correlated with the PWM signal generated in response to the dimming signal at 310. For example, the PWM signal generated by the detector at 380 may be the same as, or similar to, the PWM signal generated by the PWM generator 310

The PWM signal generated by the detector at 380 may be used directly to control the current from a PWM controllable power supply. For example, a PWM controllable power supply may provide an average current to the LEDs proportional to the duty cycle of the PWM signal generated by the detector at 380. Alternatively, or additionally, the PWM signal generated by the detector at 380 signal may be low-pass filtered (shown at 390 in FIG. 4), which may produce an analog signal, which may be similar to the analog 0-10V dimming signal received at 300. In some embodiments, the time constant of the filter at 390 may be set to be long compared to the frequency of the PWM signal, which may produce a smooth dimming level. The analog signal may be used to control a current setpoint of a power supply.

Although one example of using LED power traces for transmitting a dimming signal is shown in FIGS. 3-6, any configuration wherein dimming signals are transmitted using LED power traces may be used. In some embodiments, the modulation at 340 may include using a baseband signal other than the PWM signal. For example, the modulation at 340 may include using a pulse code modulation signal, pseudorandom codes, or any other baseband signaling scheme or combination of schemes. In some embodiments, in addition to, or alternatively to, superimposing the modulated high-frequency carrier on the LED current, the baseband signal may be directly imposed on the LED current. In some embodiments, the carrier frequency may be selected to avoid unwanted optical interference with IR remote controls or other optical devices which may be produced by modulating the LED light output. In some embodiments, the signal detection may include detection of a digital bit stream such as a pseudorandom sequence. Alternatively, or in addition, an LED lamp may include a high-frequency optical detector, which may send the dimming signal from one lamp to one or more other lamps without a wired connection.

While the invention has been described in connection with certain embodiments, it is to be understood that the invention is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A light emitting diode based light configured for replacing a fluorescent light in a light fixture, comprising:
   a housing;
   at least one light emitting diode (LED);
   a power connector at a first end of the housing configured for connection to the light fixture and configured for receiving a power signal from a power source;
   a dimming control connector at a second end of the housing configured for receiving a dimming control signal; and
   a power trace configured to:
      carry the power signal from the power connector to the LED, and
      carry the dimming control signal from the dimming control connector to the power connector, such that the power signal is controlled in response to the dimming control signal;
   a pulse-width modulation (PWM) generator configured to convert the dimming control signal to a first PWM signal; and
   a detector configured to filter the first PWM signal to produce an analog signal, wherein the filtering comprises low-pass filtering.

2. The LED-based light of claim 1, wherein the dimming control connector comprises a dimming input pin configured to receive the dimming control signal from the power connector.

3. The LED-based light of claim 2, further comprising:
   an optocoupler configured to electrically isolate the dimming input pin from the power connector to the LED.

4. The LED-based light of claim 1, wherein the detector is further configured to generate a second PWM signal with a duty cycle correlated to the first PWM signal generated by the PWM generator.

5. The LED-based light of claim 1, wherein a time constant of the low-pass filter is set to be greater than the frequency of the first PWM signal.

6. The LED-based light of claim 1, wherein the analog signal is used to control a current setpoint of the power source.

7. The LED-based light of claim 1, wherein the first PWM signal generated by the PWM generator is proportional to the analog signal.

8. A light emitting diode based light configured for replacing a fluorescent light in a light fixture, comprising:
a housing;
at least one light emitting diode (LED);
a power connector at a first end of the housing configured for connection to the light fixture and configured for receiving a power signal from a power source;
a dimming control connector at a second end of the housing configured for receiving a dimming control signal; and
a power trace configured to:
carry the power signal from the power connector to the LED, and
carry the dimming control signal from the dimming control connector to the power connector, such that the power signal is controlled in response to the dimming control signal;
a pulse-width modulation (PWM) generator configured to convert the dimming control signal to a first PWM signal;
a detector configured to generate a second PWM signal with a duty cycle correlated to the first PWM signal generated by the PWM generator; and
a PWM controllable power supply configured to carry a current to the LED, wherein the current carried by the PWM controllable power supply is proportional to the duty cycle of the second PWM signal generated by the detector.

9. The LED-based light of claim 8, wherein the detector is configured to control the current from the PWM controllable power supply.

10. A light emitting diode based light configured for replacing a fluorescent light in a light fixture, comprising:
a housing;
at least one light emitting diode (LED);
a power connector at a first end of the housing configured for connection to the light fixture and configured for receiving a power signal from a power source;
a dimming control connector at a second end of the housing configured for receiving a dimming control signal; and
a power trace configured to:
carry the power signal from the power connector to the LED, and
carry the dimming control signal from the dimming control connector to the power connector, such that the power signal is controlled in response to the dimming control signal;
a pulse-width modulation (PWM) generator configured to convert the dimming control signal to a first PWM signal; and
a transistor to modulate the first PWM signal, wherein the transistor is synchronously enabled or synchronously disabled in time with the first PWM signal.

11. The LED-based light of claim 10, wherein the modulation by the transistor is based on one or more baseband signaling schemes comprising pulse code modulation, or pseudorandom code modulation.

12. The LED-based light of claim 10, wherein the modulated first signal comprises a zero DC component.

13. A light emitting diode based light configured for replacing a fluorescent light in a light fixture, comprising:
a housing;
at least one light emitting diode (LED);
a power connector at a first end of the housing configured for connection to the light fixture and configured for receiving a power signal from a power source;
a dimming control connector at a second end of the housing configured for receiving a dimming control signal; and
a power trace configured to:
carry the power signal from the power connector to the LED, and
carry the dimming control signal from the dimming control connector to the power connector, such that the power signal is controlled in response to the dimming control signal; and
a current sensing resistor configured to:
receive a high-frequency signal; and
send the high-frequency signal to a frequency-selective circuit.

14. The LED-based light of claim 13, wherein the frequency-selective circuit is configured to:
receive the power signal, and
amplify the power signal.

15. The LED-based light of claim 13, wherein the frequency-selective circuit is configured to respond preferentially to the high-frequency signal sent by the current sensing resistor.

16. A light emitting diode based light configured for replacing a fluorescent light in a light fixture, comprising:
a housing;
at least one light emitting diode (LED);
a power connector at a first end of the housing configured for connection to the light fixture and configured for receiving a power signal from a power source;
a dimming control connector at a second end of the housing configured for receiving a dimming control signal; and
a power trace configured to:
carry the power signal from the power connector to the LED, and
carry the dimming control signal from the dimming control connector to the power connector, such that the power signal is controlled in response to the dimming control signal;
a pulse-width modulation (PWM) generator configured to convert the dimming control signal to a first PWM signal;
a detector configured to generate a second PWM signal with a duty cycle correlated to the first PWM signal generated by the PWM generator; and
a frequency-selective circuit configured to receive the power signal, and send the power signal to the detector.

17. The LED-based light of claim 1, wherein the LED comprises an external dimmer or the power source comprises a power source dimming circuit.

18. The LED-based light of claim 8, wherein the dimming control connector comprises a dimming input pin configured to receive the dimming control signal from the power connector.

19. The LED-based light of claim 18, further comprising:
an optocoupler configured to electrically isolate the dimming input pin from the power connector to the LED.

20. The LED-based light of claim 8, wherein the LED comprises an external dimmer or the power source comprises a power source dimming circuit.

21. The LED-based light of claim 10, wherein the dimming control connector comprises a dimming input pin configured to receive the dimming control signal from the power connector.

22. The LED-based light of claim 21, further comprising:
an optocoupler configured to electrically isolate the dimming input pin from the power connector to the LED.

23. The LED-based light of claim 21, further comprising:
a detector configured to generate a second PWM signal with a duty cycle correlated to the first PWM signal generated by the PWM generator.

24. The LED-based light of claim 21, wherein the LED comprises an external dimmer or the power source comprises a power source dimming circuit.

25. The LED-based light of claim 13, wherein the dimming control connector comprises a dimming input pin configured to receive the dimming control signal from the power connector.

26. The LED-based light of claim 25, further comprising:
an optocoupler configured to electrically isolate the dimming input pin from the power connector to the LED.

27. The LED-based light of claim 13, further comprising:
a pulse-width modulation (PWM) generator configured to convert the dimming control signal to a first PWM signal.

28. The LED-based light of claim 27, further comprising:
a detector configured to generate a second PWM signal with a duty cycle correlated to the first PWM signal generated by the PWM generator.

29. The LED-based light of claim 13, wherein the LED comprises an external dimmer or the power source comprises a power source dimming circuit.

30. The LED-based light of claim 16, wherein the dimming control connector comprises a dimming input pin configured to receive the dimming control signal from the power connector.

31. The LED-based light of claim 30, further comprising:
an optocoupler configured to electrically isolate the dimming input pin from the power connector to the LED.

32. The LED-based light of claim 16, wherein the LED comprises an external dimmer or the power source comprises a power source dimming circuit.

* * * * *

UNITED STATES PATENT AND TRADEMARK OFFICE
CERTIFICATE OF CORRECTION

PATENT NO. : 9,750,100 B2
APPLICATION NO. : 15/148027
DATED : August 29, 2017
INVENTOR(S) : John Ivey and Francis Palazzolo Page 1 of 1

It is certified that error appears in the above-identified patent and that said Letters Patent is hereby corrected as shown below:

On the Title Page

Column 1, Item (72) Inventors, First Inventor, John Ivey:
Delete "Farminton Hills," and insert -- Farmington Hills, --, therefor.

Signed and Sealed this
Twenty-fourth Day of October, 2017

Joseph Matal
*Performing the Functions and Duties of the
Under Secretary of Commerce for Intellectual Property and
Director of the United States Patent and Trademark Office*